US007694007B1

(12) United States Patent
Dubrovsky et al.

(10) Patent No.: US 7,694,007 B1
(45) Date of Patent: Apr. 6, 2010

(54) METHODS AND APPARATUS FOR MANAGING REQUESTS

(75) Inventors: Alexander Dubrovsky, Westborough, MA (US); Yifeng Chen, Milford, MA (US); Daniel J. Strom, North Andover, MA (US); James E. Lavallee, Boylston, MA (US)

(73) Assignee: EMC Corporation, Hopkinton, MA (US)

( * ) Notice: Subject to any disclaimer, the term of this patent is extended or adjusted under 35 U.S.C. 154(b) by 1407 days.

(21) Appl. No.: 11/094,772

(22) Filed: Mar. 30, 2005

(51) Int. Cl.
*G06F 15/16* (2006.01)
(52) U.S. Cl. ...................... 709/232; 709/233
(58) Field of Classification Search ............... 709/232, 709/233
See application file for complete search history.

(56) References Cited

U.S. PATENT DOCUMENTS 6,581,104 B1 * 6/2003 Bereiter ...................... 709/232
6,970,936 B2 * 11/2005 Fields et al. ................ 709/232

* cited by examiner

*Primary Examiner*—Vivek Srivastava
*Assistant Examiner*—Adnan Mirza
(74) *Attorney, Agent, or Firm*—Chapin IP Law, LLC

(57) ABSTRACT

A management control center communicates with multiple agents in a storage area network. On behalf of the management control center, the agents communicate with a switch resource management entity that maintains configuration information about resources such as a group or groups of switches in the storage area network. Based on a chain of communications from the management control center through the agents to the remote management entity, the management control center can indirectly learn about a configuration of switch resources in the storage area network. The agent utilizes a calculated current load value (e.g., a value indicating a relative burden placed on the remote management entity to service the forwarded set of requests) to selectively forwards requests to the switch resource management entity. This technique ensures that the switch resource management entity is not overwhelmed by a task of servicing too many requests at the same time.

18 Claims, 9 Drawing Sheets

METHODS AND APPARATUS FOR MANAGING REQUESTS

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to an increased need for storage by integrating high capacity data storage systems, data communications devices (e.g., switches), and computer systems (e.g., host computers or servers) into networks called "storage networks" or "Storage Area Networks" (SANs.) In general, a storage area network is a collection of data storage systems that are networked via a switching fabric to a number of host computer systems operating as servers. The host computers access data stored in the data storage systems on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional network management storage application generates a graphical user interface utilized by a network manager to graphically select, interact with, and manage local or remote devices and associated software processes associated with the storage area network. Based on use of the graphical user interface in combination with an input device such as a hand operated mouse and corresponding pointer displayed on a viewing screen, a network manager is able to manage hardware and software entities such as file systems, databases, storage devices, peripherals, network data communications devices, etc., associated with the storage area network. Consequently, a network management station and associated management software enables a network administrator or systems manager (a person responsible for managing the storage network) to manage the storage area network and its resources. One purpose of managing storage area network resources is to maintain the storage area network so that the storage area network is properly configured to provide efficient data access to many users.

To manage devices such as switches in a storage area network, a network administrator, via the graphical user interface discussed above, may arbitrarily assign agents (e.g., entities that perform tasks on behalf of one or more other entities) in the storage area network to manage the switches through a common storage area network management device. For example, a network administrator may assign a first agent a duty of managing a first switch based on communications from the first agent to a management device that, in turn, manages or controls the first switch. Additionally, the network administrator may assign a second agent a duty of managing a second switch device based on communications from the second agent to the same management device that in turn controls the second switch. Accordingly, multiple agents can communicate with the same management device to manage switches under the control of the management device.

The first agent and the second agent typically can communicate with the management device to learn of configuration information associated with respective switches. For example, the first agent can send a request to the management device to learn of configuration information associated with the first switch. The second agent can send a request to the management device to learn of configuration information associated with the second switch. After receiving respective replies from the management device, the respective agents forward the information to a source (e.g., a management control center) that initially prompted the agents to retrieve the configuration information frm the management device.

SUMMARY

Conventional network management applications that support management of network resources via use of multiple agents in a storage area network typically suffer from a number of deficiencies. For example, one or more agents forwarding requests to a management device, as discussed above, can inadvertently inundate the management device with respective tasks of simultaneously servicing the requests for information. For example, a multitude of agents may concurrently request information from the management device about corresponding switches. When inundated with such concurrent requests, the management device may not be able to respond to a respective agent within a timeout window. In such a case, if the management device does not respond to an inquiry by an agent within the timeout window, the agent will give up and resend the same request to the management device. Resending the same request to the management device can cause further congestion to the management device and a respective communication link because the management device may have been in the middle of replying to the original request by the agent. Time spent by the management device to service the "aborted" request is therefore wasted.

Timeouts may occur because respective communication links between agents and the management device does not support the bandwidth required so that the management device can efficiently distribute the requested information to respective agents. Timeouts may also occur because the management device does not have appropriate processing power to formulate replies and disseminate information to multiple agents quick enough. Either of these types of bottlenecks, therefore, can result in poor system performance of a storage area network.

Techniques discussed herein deviate with respect to conventional network management applications. For example, embodiments of the present application include mechanisms and techniques to keep track of a current burden on a remote management entity to service previously forwarded requests. Based on the current burden, the agent selectively forwards additional requests to the remote management entity so as not to inundate the remote management entity with too many requests at the same time.

More specifically, according to one configuration discussed herein, a management control center communicates with multiple agents in a storage area network. The agents each communicate with a switch resource management entity that maintains configuration information about resources such as a group or groups of switches in the storage area network. Based on a chain of communications from the management control center through the agents to the remote management entity, the management control center can indirectly control or learn about a configuration of switch resources in the storage area network. For example, the management control center issues requests to agents. The agents forward the requests to the remote management entity for servicing by the remote management entity. Eventually, the remote management entity communicates requested information through the agent to the management control center.

The agent can calculate a current load value corresponding to a relative burden placed on the remote management entity to service the forwarded set of requests. The agent utilizes the current load value as a gauge of whether to forward further requests to the management entity. While the remote management entity services a previously forwarded set of requests, assume in this example that the agent receives a new request to be forwarded from the agent to the remote management entity. As discussed, the agent selectively forwards the new request to the remote management entity so that it is not inundated with requests. In other words, if a current burden on the remote management entity is relatively high based on the current load value as calculated by the agent, the agent does not immediately forward the newly received request to the remote management entity. Conversely, if the current load value calculated by the agent is relatively low, the agent forwards the new request to the remote management entity. This technique of selectively forwarding the requests from the agent increases system efficiency because fewer, if any, timeouts occur as a result of the remote management entity being overburdened with trying to respond to or handle too many requests at the same time.

One method of calculating the current load value corresponding to a relative burden placed on the remote management entity to service a forwarded set of requests includes first determining a respective weight value for each corresponding request in a set of requests already forwarded to the remote management entity for servicing. Each respective weight value indicates a relative burden placed on the remote management entity to service a corresponding request forwarded to the remote management entity. Note that the weights associated with each request can vary depending on a respective type of request. For example, some types of requests require more resources to service than others. The agent sums respective weight values associated with each request in the set of requests to produce the current load value.

In addition to calculating the current load value, the agent can identify a threshold load value corresponding to an ability of the remote management entity to simultaneously handle multiple requests for information forwarded by the agent. For example, the agent can receive or identify attributes (e.g., processing speed, amount of memory, communication bandwidth, etc.) associated with the remote management entity or its respective resources. Based on the attributes associated with the resources of the remote management entity, the agent can identify a threshold load value indicating a relative ability of the remote management entity to simultaneously handle multiple pending requests for information forwarded by the agent.

In response to receiving a new request in the above example to be forwarded from the agent to the remote management entity, the agent identifies a weight value corresponding to an additional burden that would be placed on the remote management entity if the new request were forwarded to the remote management entity for servicing. To determine whether to forward the new request, the agent performs a comparison of a sum of the current load value and weighted value (of the new request) with respect to the threshold load value. If the sum of the current load value and the weighted value (associated with the new request) is less than the threshold load value, the agent forwards the new request to the remote management entity. If the sum of the current load value and the weighted value (associated with the new request) is more than the threshold load value, the agent queues the new request at the agent in lieu of forwarding the new request to the remote management entity. In this latter case, if the agent thereafter receives an indication that the remote management entity completes servicing of one or more requests in the previously forwarded set of requests, the agent potentially forwards the new request to the remote management entity for servicing. In other words, if the current load value decreases due to servicing a pending request at remote management entity, the remote management entity may then be able to handle servicing of the new request.

In summary, therefore, a technique of selectively forwarding the new request to the remote management entity includes detecting whether forwarding the new request to the remote management entity, if forwarded and processed along with the set of requests, would overburden the remote management entity with a task of servicing requests forwarded from the agent.

In addition to the embodiments discussed above, other embodiments herein include a computerized device (e.g., a host computer, workstation, etc.) configured to support the aforementioned method/operations to selectively forward requests from an agent. In such embodiments, the computerized device such as a host entity hosting an agent application includes a memory system, a processor (e.g., a processing device), a display, and an interconnect. The interconnect supports communications among the display, the processor, and the memory system. The memory system is encoded with an agent application that, when executed on the processor, produces a process that supports selectively forwarding requests to a remote management entity as discussed.

Yet other embodiments disclosed herein include software programs to perform the method embodiment and operations summarized above and disclosed in detail below under the heading Detailed Description. More particularly, a computer program product (e.g., a computer-readable medium) including computer program logic encoded thereon may be executed on a computerized device to support selectively forwarding requests form an agent (or agents) as explained herein. The computer program logic, when executed on at least one processor with a computing system, causes the processor to perform the operations (e.g., the methods) indicated herein as embodiments. Such embodiments are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular configuration herein is directed to a computer program product that includes a computer readable medium having instructions stored thereon for supporting management of network resources. The instructions, when carried out by a processor of a respective computer device, cause the processor to perform the steps of: i) forwarding a set of requests from the agent to the remote management entity for servicing by the remote management entity, ii) calculating a current load value corresponding to a relative burden placed on the remote management entity to service the forwarded set of requests, iii) while the remote management entity services the set of requests, receiving a new request to be forwarded from the agent to the remote management entity, and iv) selectively forwarding the new request to the remote management entity depending on the current load value associated with servicing the forwarded set of requests. Other embodiments of the present application include software programs to perform any of the method embodiment steps and operations summarized above and disclosed in detail below.

Techniques herein are well suited for use in systems in which a management control center communicates with an assigned agent to request information associated with switches managed by a switch resource management entity. However, it should be noted that embodiments herein are not limited to use in such applications.

It should be understood that the system herein can be embodied as a software program or as a software program operating in conjunction with corresponding hardware. Example embodiments of the present application may be implemented in conjunction with EMC's Control Center software application that provides graphical management functionality for storage area network resources and in computerized devices that operate the Control Center software. Control Center software is manufactured by EMC Corporation of Hopkinton, Massachusetts, USA.

BRIEF DESCRIPTION OF THE DRAWINGS

The foregoing and other objects, features, and advantages of the present application will be apparent from the following more particular description of preferred embodiments of the present application, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one configuration herein, a management control center communicates with multiple agents in a storage area network. On behalf of the management control center, the agents communicate with a remote device such as a switch resource management entity that maintains configuration information about resources such as a group or groups of switches in the storage area network. Based on a chain of communications from the management control center through the agents to the remote management entity, the management control center can learn about a configuration of switch resources in the storage area network. The agent utilizes a calculated current load value (e.g., a value indicating a relative current burden already placed on the remote management entity to service a previously forwarded set of requests) to determine when and whether to forward requests to the switch resource management entity. Selectively forwarding requests from the agents ensures that the switch resource management entity is not overwhelmed by a task of servicing too many requests at the same time.

Figure 1:
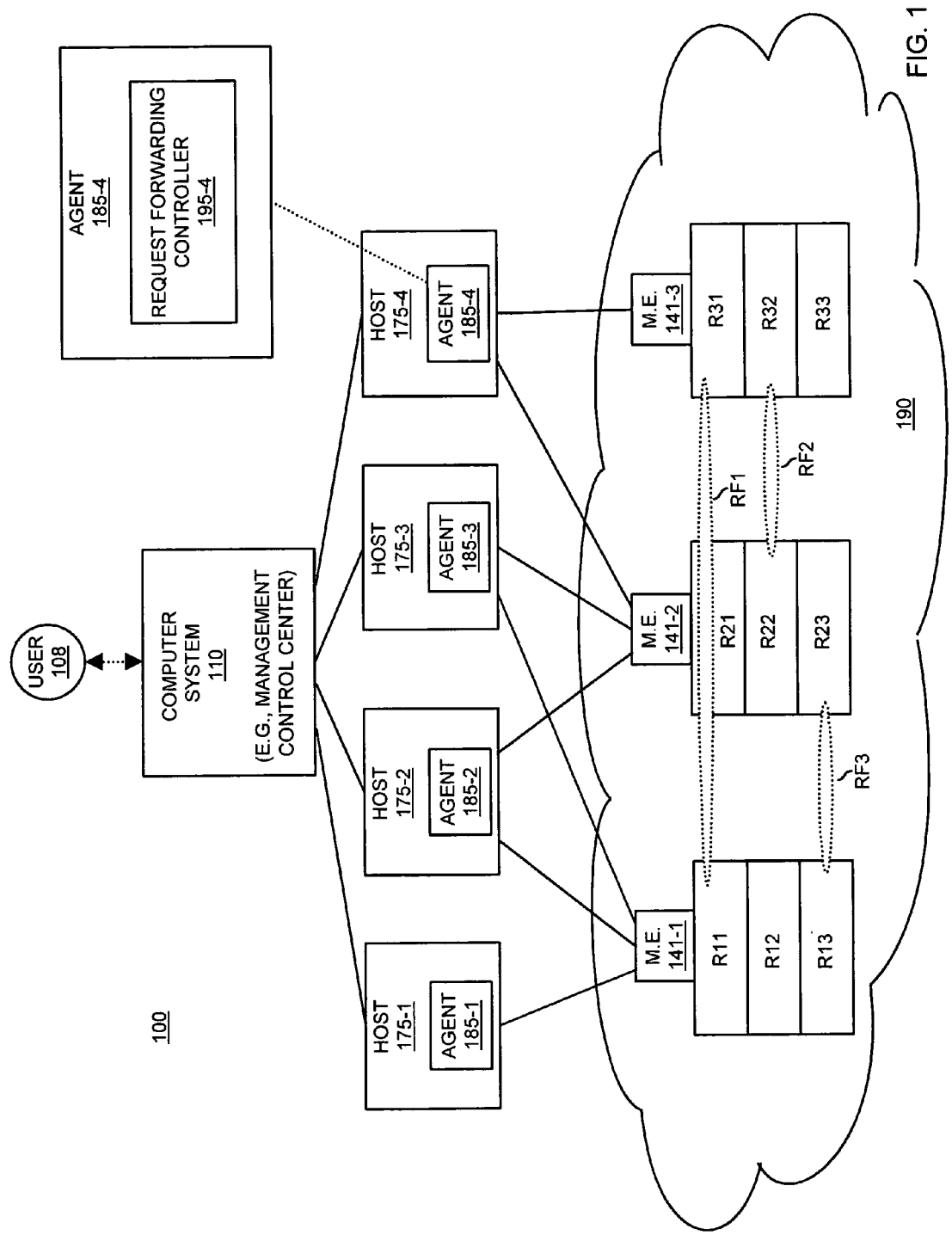
FIG. 1 is a diagram of one or more agents that selectively forward messages according to an embodiment herein.

FIG. 1 is a diagram illustrating an environment 100 in which agents 185 selectively forward requests to management entities 141 according to an embodiment herein. As shown, environment 100 includes computer system 110, hosts 175, and network 190. Set of hosts 175 includes host 175-1, host 175-2, host 175-3, and host 175-4. Each of hosts 175 includes at least one respective agent. For example, agent 185-1 resides on host 175-1, agent 185-2 resides on host 175-2, agent 185-3 resides on host 175-3, agent 185-4 resides on host 175-4. Network 190 includes management entity 141-1, management entity 141-2, and management entity 141-3. Depending on a configuration, management entity 141-1 can potentially manage respective resources R11, R12, R13, RF1, and RF3 (e.g., switch resources and fabric resources). Management entity 141-2 can potentially manage respective resources R21, R22, R23, RF1, RF2, and RF3. Management entity 141-3 can potentially manage respective resources R31, R32, R33, RF1, and RF2.

In general, agents 185 discover and manage resources R11, R12, . . . , R33 (e.g., switch resources), as well as RF1, RF2, and RF3 (e.g., fabric resources) in network 190 by communicating with management entities 141. For example, computer system 110 can utilize agent 185-4 to communicate (such as forward requests) with either or both management entity 141-2 and management entity 141-3. Communications from the computer system 110 through the agents 185 to respective management entities 141 and, in a reverse direction from a management entities 141 through agents 185 to computer system 110, enable discovery and management of device attributes (e.g., management capabilities) such as configuration, name of switch ports, connectivity paths, zone information, vendor type, etc. associated with resources in environment 100 (e.g., a storage area network environment as more particularly shown in the sample configuration of FIG. 9).

In the specific example configuration as shown in FIG. 1, computer system 110 can communicate through agent 185-4 to either or both of management entity 141-2 and management entity 141-3. Request forwarding controller 195-4 of agent 185-4 controls forwarding of requests from computer system 110 to management entity 141-3 so that a respective management entity 141 is not inundated with handling too many simultaneous requests. According to one possible configuration, only a single agent is assigned to manage a set of respective resources in environment 100. This possible configuration is further discussed in related U.S. patent application Ser. No. 11/023,668 entitled "METHODS AND APPARATUS FOR MANAGING GROUPS OF RESOURCES," filed on Dec. 28, 2004, the entire teachings of which are incorporated herein by this reference. Other configurations in addition to this configuration are discussed below.

Figure 2:
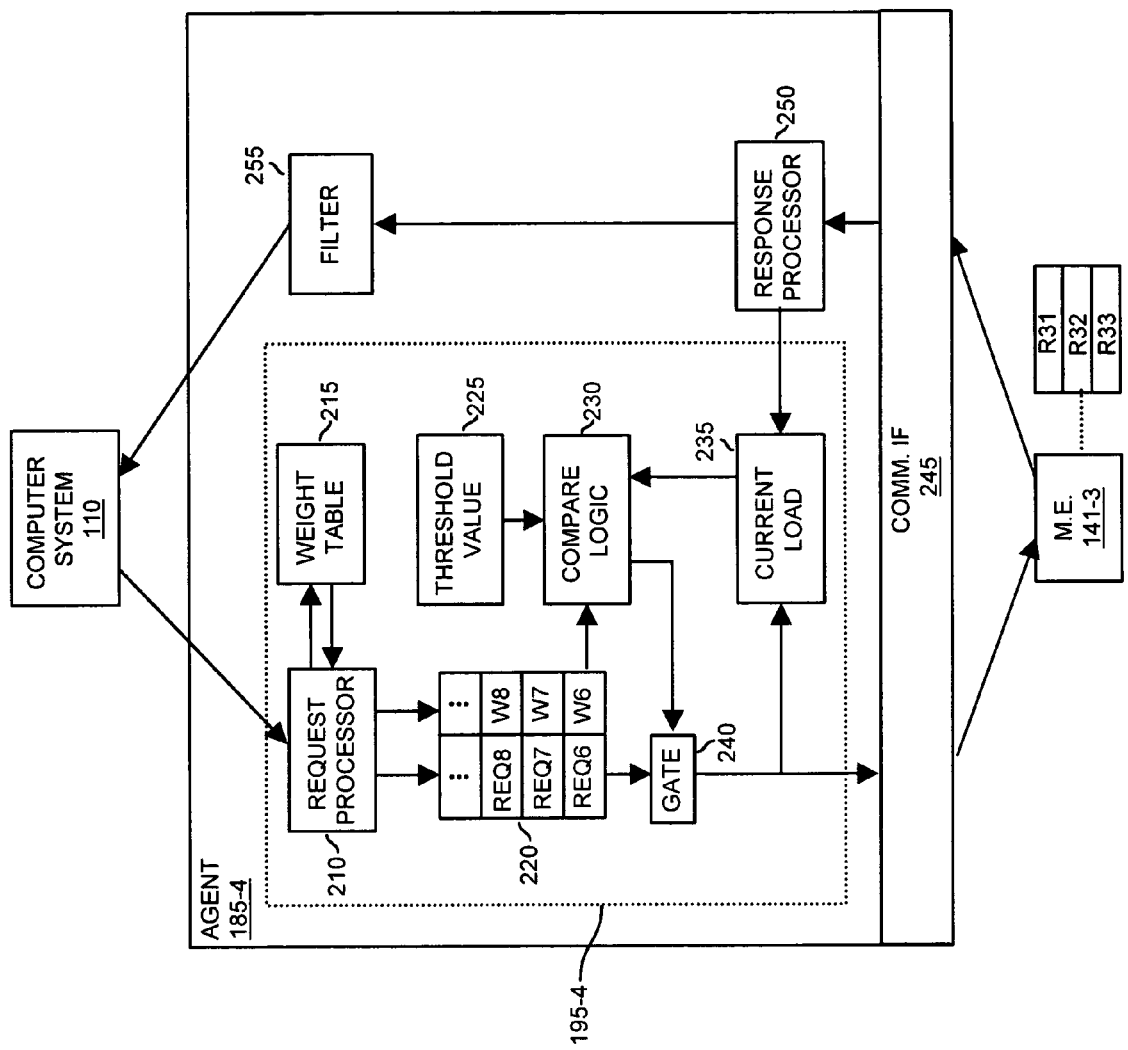
FIG. 2 is a diagram of an agent that derives weight values associated with received requests, at least temporarily stores the requests in a queue, and selectively forwards the requests depending on a current load on a management entity to which the agent forwards the requests.

FIG. 2 is a diagram of an agent 185-4 that derives respective weight values associated with requests to be forwarded from agent 185-4 to a respective management entity 141-3. For example, computer system 110 forwards requests to agent 185-4. In turn, agent 185-4 selectively forwards the requests to management entity 141-3. Other agents 185 in environment 100 can operate in a similar manner as discussed below for agent 185-4. Also, recall that multiple agents 185 can reside in the same host 175.

As mentioned, agent 185-4 forwards requests to management entity 141-3 depending on a current load on a respective management entity 141. As shown, agent 185-4 includes request processor 210, weight table 215, queue 220, threshold value 225, compare logic 230, current load value 235, gate 240, communication interface 245, response processor 250, and filter 255.

In general, computer system 110 generates and forwards messages, commands, requests, etc. (whatever they may be) to management entity 141-3 through agent 185-4. Upon receipt of a request from computer system 110, request processor 210 accesses weight table 215 to identify a weight value associated with a burden that would be placed on management entity 141-3 if the respective request were forwarded to management entity 141-3 for servicing. Request processor 210 stores the received request along with a respective weight value in queue 220 (e.g., a first in first out buffer).

Gate 240 pops requests off queue 220 and forwards them to management entity 141-3 depending on input from compare logic 230. Compare logic 230 generates a signal to gate 240 indicating whether to forward a next request in queue 220 depending on a number of factors as discussed below. According to one configuration, if queue 220 becomes overloaded with requests, agent 185-4 notifies the computer system 110 of such an event to prevent computer system 110 from issuing too many requests for queue to handle and prevent timeouts from occurring.

One factor associated with whether to forward a next request in queue 220 to management entity 141-3 is current load value 235. Agent 185-4 keeps track of current load value 235 to identify a relative burden associated with processing of requests already forwarded to management entity 141-3 for processing.

Another factor associated with whether to forward a next request in queue 220 is threshold value 225. Agent 185-4 keeps track of threshold value 225 to identify a maximum relative burden that management entity 141-3 can manage at one time without being overburdened by receiving too many requests at once. Agent 185-3 may identify threshold value 225 by receiving attributes (e.g., a processor speed, memory, etc. associated with resources) of the management entity 185-4 employed to facilitate servicing of requests. Based on the attributes, the agent identifies a threshold load value corresponding to an ability of the remote management entity to simultaneously handle multiple pending requests for information forwarded by the agent. According to one configuration, the agent 185-4 accesses a table (e.g., in the management entity 141-3, agent 185-4, etc.) to identify a threshold value 225 associated with the management entity 141-3.

Yet another factor associated with whether to forward a next request REQ6 in queue 220 is a weight value (e.g., W6) associated with a next request REQ6 in queue 220. As discussed, request processor 210 utilizes weight table 215 to generate a weight value associated with a respective request. According to one configuration, the agent 185-4 and, more specifically, request processor 210 identifies a weight value W6 or additional burden associated with the new request REQ6 based on multiple parameters such as: i) a type of resource (e.g., type of managed switch device such as manufacturer) managed by the remote management entity, ii) an interface type associated with a respective communication interface or protocol used to communicate between the management entity 141-3 and agent 185-4, types may include or support protocols such as a.) SNMP (Simple Network Management Protocol), b.) FAL (Fabric Access Layer), c.) SMI (Storage Management Interface), and/or d.) SWAPI (SWitch Application Programming Interface), etc., and iii) a type of information (e.g., zone configuration information, port information, switch device information, etc.) being requested from the management entity 141-3 for a respective request.

One way to implement "weighting" is to configure weight table 215 (see also FIG. 8) as a multi-dimensional array. In this instance, agent 185 and, more specifically, request processor 210 utilizes request attributes for the above 3 parameters to identify a weight value associated with a given received request. Such a weight table may be scaled back to a single-dimensional, two-dimensional array, three dimensional array, etc. or implemented as an algorithm based on the above parameters or other system or device parameters.

Based on a combination of current load value 235, threshold value 225, and weight value (e.g., W6) associated with a next request in queue 220, agent 185-4 employs compare logic 230 to regulate forwarding requests to management entity 141-3 so that the current load value 235 of pending requests in management entity 141-3 does not exceed a specified load such as that indicated by threshold value 225. That is, according to one configuration, compare logic 230 sums weight value W6 associated with REQ6 (e.g., request #6 in a series of requests) to current load value 235. If a sum of the current load value 235 and weight value W6 exceeds the threshold value 225 associated with management entity 141-3, then compare logic 230 signals gate 240 not to allow forwarding of request REQ6 to management entity 141-3. On the other hand, if a sum of the current load value 235 and weight value W6 does not exceed the threshold value 225 associated with management entity 141-3, then compare logic 230 signals gate 240 to allow forwarding of request REQ6 to management entity 141-3. In the latter case, after gate 240 forwards request REQ6 to management entity 141-3, other pending requests REQ7 and REQ8 as well as respective weight values W7 and W8 drop down in queue 220. Note that a weight value associated with a respective request scan be determined by compare logic 230 at run-time rather than stored in queue 220.

Agent 185-4 employs the above routine whether to forward any remaining or future received requests in queue 240. Consequently, queue 240 fills up with requests as computer system 110 forwards requests to agent 185-4 faster than management entity 141-3 is able to process them. Conversely, queue 220 empties of requests as computer system 110 forwards requests to agent 185-4 slower than management entity 141-3 is able to service them.

Management entity 141-3 generates responses to the requests forwarded by agent 185-4. For each request serviced by management entity 141-3, agent 185-4 adjusts current load value 235 to reflect that a respective request has been processed and, therefore, no longer poses a processing burden on the management entity 141-3. For example, management entity 141-3 sends a response to a given request to agent 185-4. Agent 185-4 receives a respective response through communication interface 245 to response processor 250. Response processor 250 updates the current load value 235 to reflect that the current burden on management entity 141-3 to service requests has been diminished by a specified amount associated with the serviced request. That is, response processor 250 decreases current load value 235 by a respective weight value associated with the request that has been serviced by management entity 141-3.

In addition to adjusting a current load value 235, response processor 250 forwards a response and/or information associated with a serviced request to filter 255 of agent 185-4. According to one configuration, computer system 110 can request information associated with a single resource such as resource R31. As previously discussed, management entity 141-3 tracks information associated with a group of resources R31, R32, and R33. Management entity 141-3 may not be able to split information associated with a group of resources. For example, when agent 185-4 requests configuration information associated with R31, management entity 141-3 replies with configuration information associated with each of resources R31, R32, and R33. In this case, filter 255 identifies that computer system 110 requested information associated with R31 and therefore strips off the information associated with R32 and R33 instead of just configuration information associated with resource R31. Filter 255 forwards the information associated with R31 to computer system 110 to satisfy the original request.

Accordingly, one embodiment herein involves forwarding a given request to the management entity 141-3 for information associated with one or more resources managed by the management entity 141-3. In response to forwarding a request, the agent 185-4 receives a response associated with the given request from the management entity 141-3. As discussed, a respective response from the management entity 141-3 can include requested information (e.g., information associated with resource R31) as well as non-requested information (e.g., information associated with resource R32 and R33). The filter 255 of agent 185-4 processes the response received from the management entity 141-3 to filter out the non-requested information associated with the other resources managed by the remote management entity. Thereafter, the agent 185-4 forwards the requested information to computer system 110.

As briefly discussed above, agent 185-4 includes a respective communication interface 245 (e.g., management application programming interfaces such as ESNAPI) to enable communications with management entity 141-3 based on, for example, communication protocols such as i) SNMP (Simple Network Management Protocol), ii) FAL (Fabric Access Layer), iii) SMI (Storage Management Interface), and/or iv) SWAPI (SWitch Application Programming Interface), etc. A type of communication protocol utilized to communicate between agent 185-4 and management entity 141-3 depends at least partially on a manufacturer of the management entity and the resources that it oversees.

Figure 9:
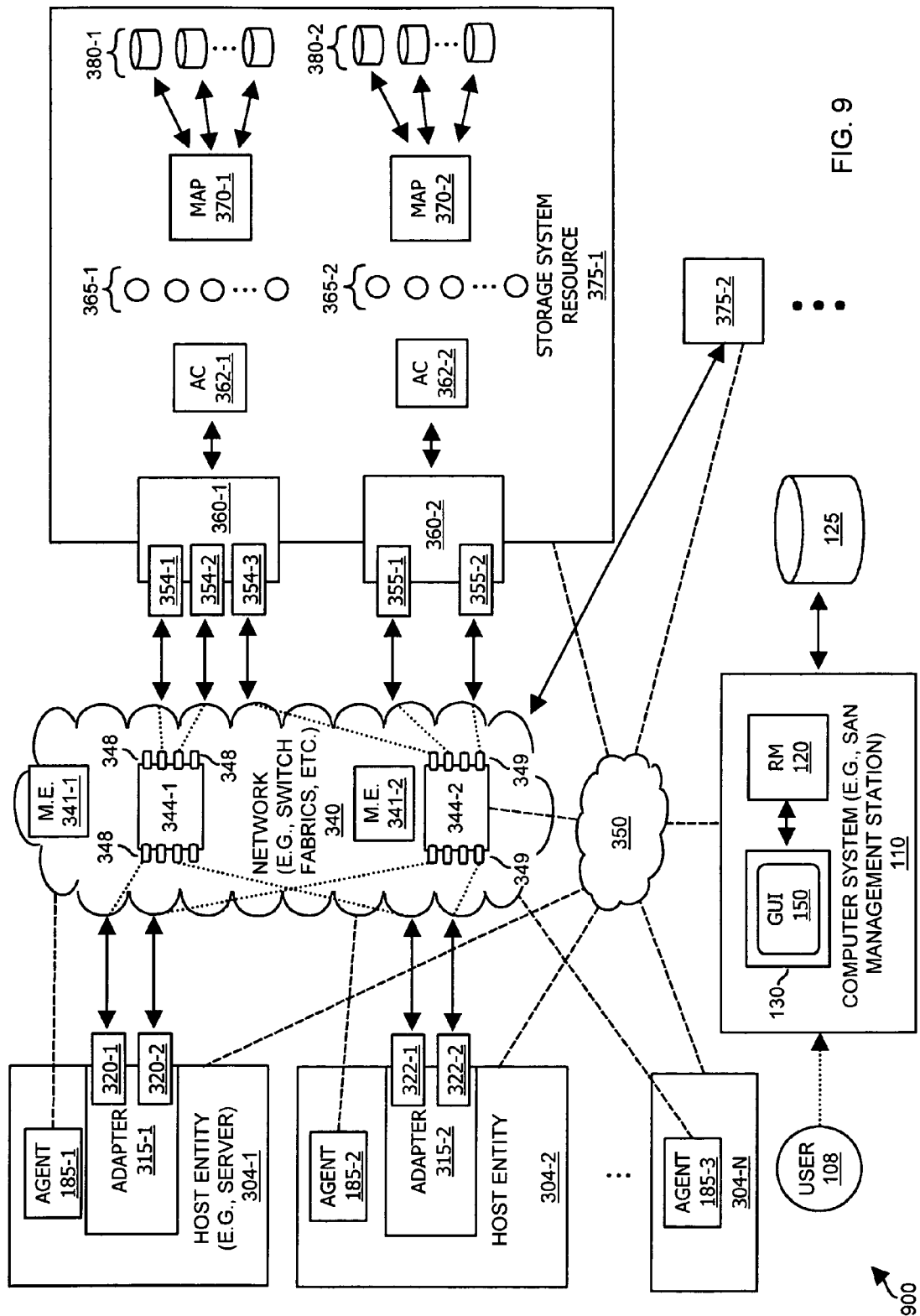
FIG. 9 is a block diagram of a storage area network and a management station configured to utilize agents to manage a storage area network environment.

As mentioned, communications between the agent 185-4 and respective management entity 141-3 enable discovery and management of device attributes (e.g., management capabilities) such as configuration, name of switch ports, connectivity paths, zone information, vendor type, etc associated with resources in environment 100 (e.g., a storage area network environment as more particularly shown in FIG. 9).

According to one configuration, multiple agents 185 can be assigned to forward requests to the same management entity 141 to convey responses back to computer system 110. In such a case, the agents 185 communicate amongst each other to learn how each other agent is loading a respective management entity 141. A respective management entity 141 may also provide feedback to the agents of its current load conditions and whether it can handle receiving new requests. Consequently, the agents 185 and management entities 141 can work in concert so that a management entity 141 is not overburdened with servicing too many requests at the same time.

Figure 3:
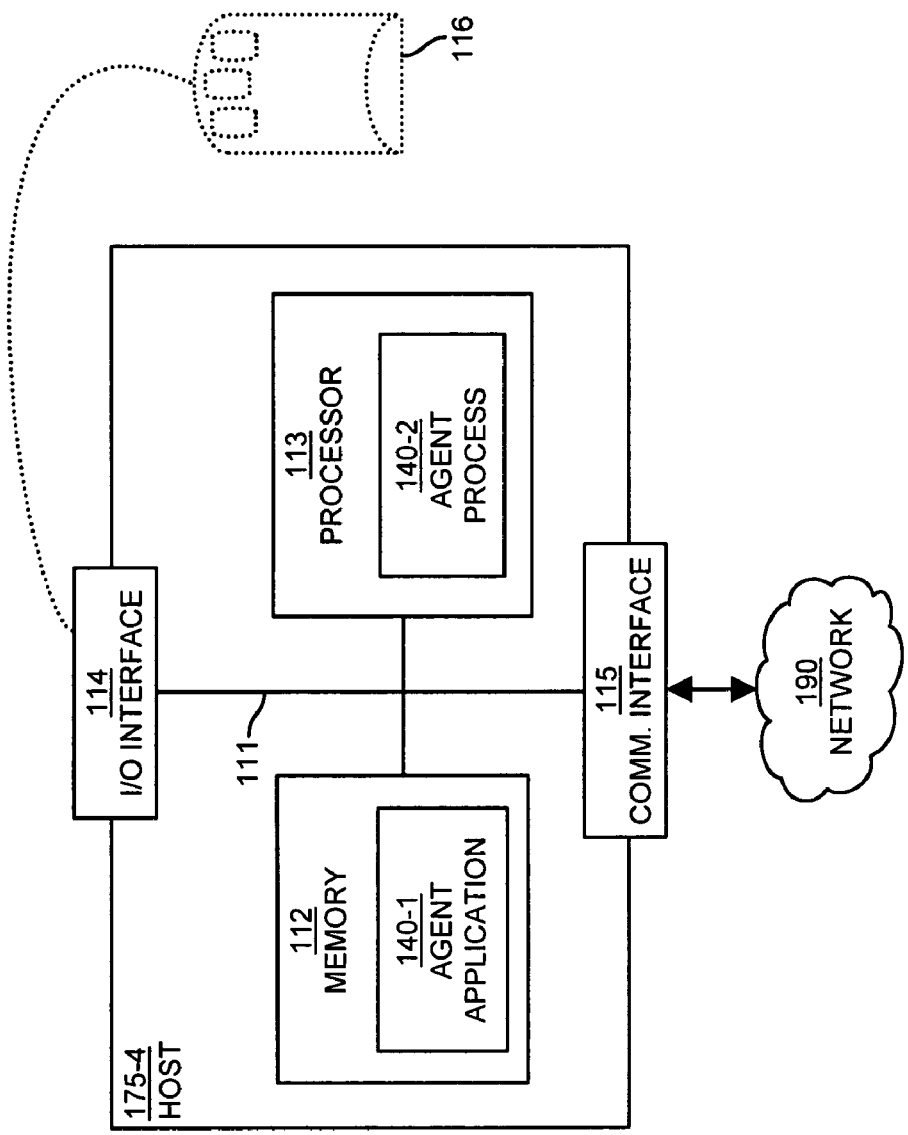
FIG. 3 is a block diagram of a processing device suitable for executing an agent process according to an embodiment of the present application.

FIG. 3 is a block diagram illustrating an example architecture of a host 175-4 for executing an agent application 140 according to embodiments herein. Host 175-4 may be a computerized device such as a personal computer, workstation, portable computing device, console, network terminal, processing device, router, server, etc. As shown, host 175-4 of the present example includes an interconnect 111 that couples a memory system 112, a processor 113, I/O interface 114, and a communications interface 115. Peripheral devices 116 (e.g., one or more optional user controlled devices such as a keyboard, mouse, display screens, etc.) couple to processor 113 through I/O interface 114.

Communications interface 115 of host 175-4 enables host 175-4 to communicate over network 190 to other devices (i.e., resources) associated with storage area network environment 100.

As shown, memory system 112 is encoded with an agent application 140-1 supporting assignment of management capabilities associated with a network device in storage area network environment 100. Agent application 140-1 may be embodied as software code such as data and/or logic instructions (e.g., code stored in the memory or on another computer readable medium such as a disk) that supports processing functionality according to different embodiments described herein. During operation, processor 113 accesses memory system 112 via the interconnect 111 in order to launch, run, execute, interpret or otherwise perform the logic instructions of the agent application 140-1. Execution of agent application 140-1 produces processing functionality in agent process 140-2. In other words, the agent process 140-2 represents one or more portions of the agent application 140-1 (or the entire application) performing within or upon the processor 113 in the host 175-4.

It should be noted that a respective agent 185 (in FIG. 1) executed in a host 175 can be represented by either one or both of the agent application 140-1 and/or the agent process 140-2. For purposes of the discussion of the operation of embodiments of the present application, general reference will be made to the agents 185 as performing or supporting the various steps and functional operations to carry out the features of embodiments of the present application.

It should be noted that, in addition to the agent process 140-2, embodiments herein include the agent application 140-1 itself (i.e., the un-executed or non-performing logic instructions and/or data). The agent application 140-1 may be stored on a computer readable medium such as a floppy disk, hard disk or in an optical medium. The agent application 140-1 may also be stored in a memory type system such as in firmware, read only memory (ROM), or, as in this example, as executable code within the memory system 112 (e.g., within Random Access Memory or RAM). In addition to these embodiments, it should also be noted that other embodiments herein include the execution of agent application 140-1 in processor 113 as the agent process 140-2. Thus, those skilled in the art will understand that the host 175-4 (e.g., computer system) may include other processes and/or software and hardware components, such as an operating system that controls allocation and use of hardware resources.

Functionality supported by host 175-4 and, more particularly, agent 185-4 will now be discussed via flowcharts in FIG. 4-7. For purposes of this discussion, agent 185-4 or host 175-4 generally performs steps in the flowcharts. This functionality can be extended to the other entities as well. Note that there will be some overlap with respect to concepts discussed above for FIGS. 1 and 2. Also, note that the steps in the below flowcharts need not always be executed in the order shown.

Figure 4:
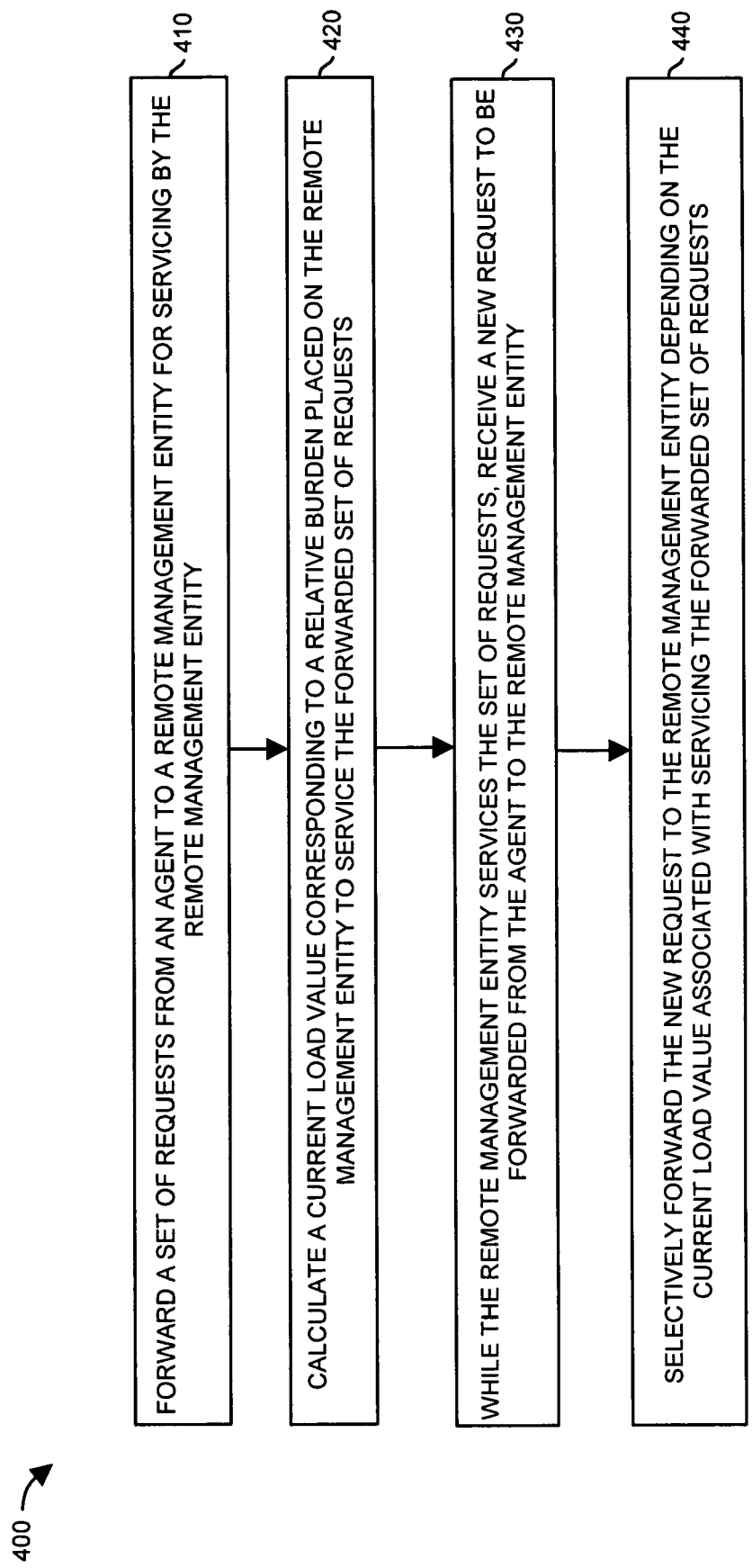
FIG. 4 is a flowchart illustrating a technique of selectively forwarding requests according to an embodiment herein.

Now, more particularly, FIG. 4 is a flowchart 400 illustrating a technique of selectively forwarding requests from an agent 185-4 to a management entity 141-3 so that the management entity 141-3 is not inundated with too many requests at the same time.

In step 410, the agent 185-4 forwards a set of requests (e.g., requests REQ1, REQ2, REQ3, REQ4, and REQ5) to a remote management entity 141-3 for servicing by the remote management entity 141-3.

In step 420, the agent 185-4 calculates or maintains a current load value 235 corresponding to a relative burden placed on the remote management entity 141-3 to service the forwarded set of requests.

In step 430, the agent 185-4, while the remote management entity 141-3 services the set of requests, receives a new request (e.g., request REQ6) to be forwarded from the agent 185-4 to the remote management entity 141-3.

In step 440, the agent 185-4 selectively forwards the new request to the remote management entity 141-3 depending on the current load value 235 associated with servicing the forwarded set of requests.

Figure 5:
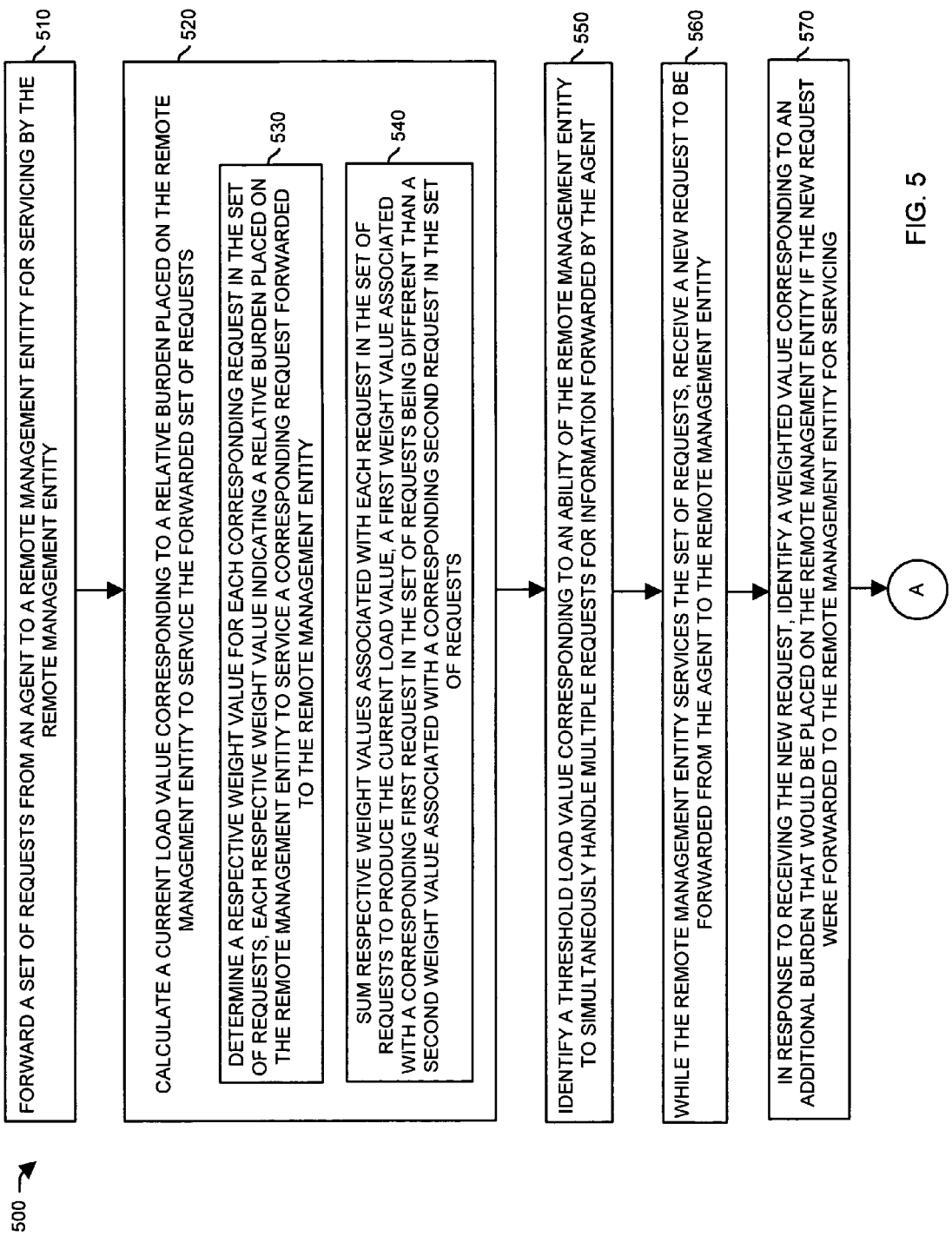
FIGS. 5 and 6 combine to form a more detailed flowchart illustrating a technique of selectively forwarding requests according to an embodiment herein.
Figure 6:
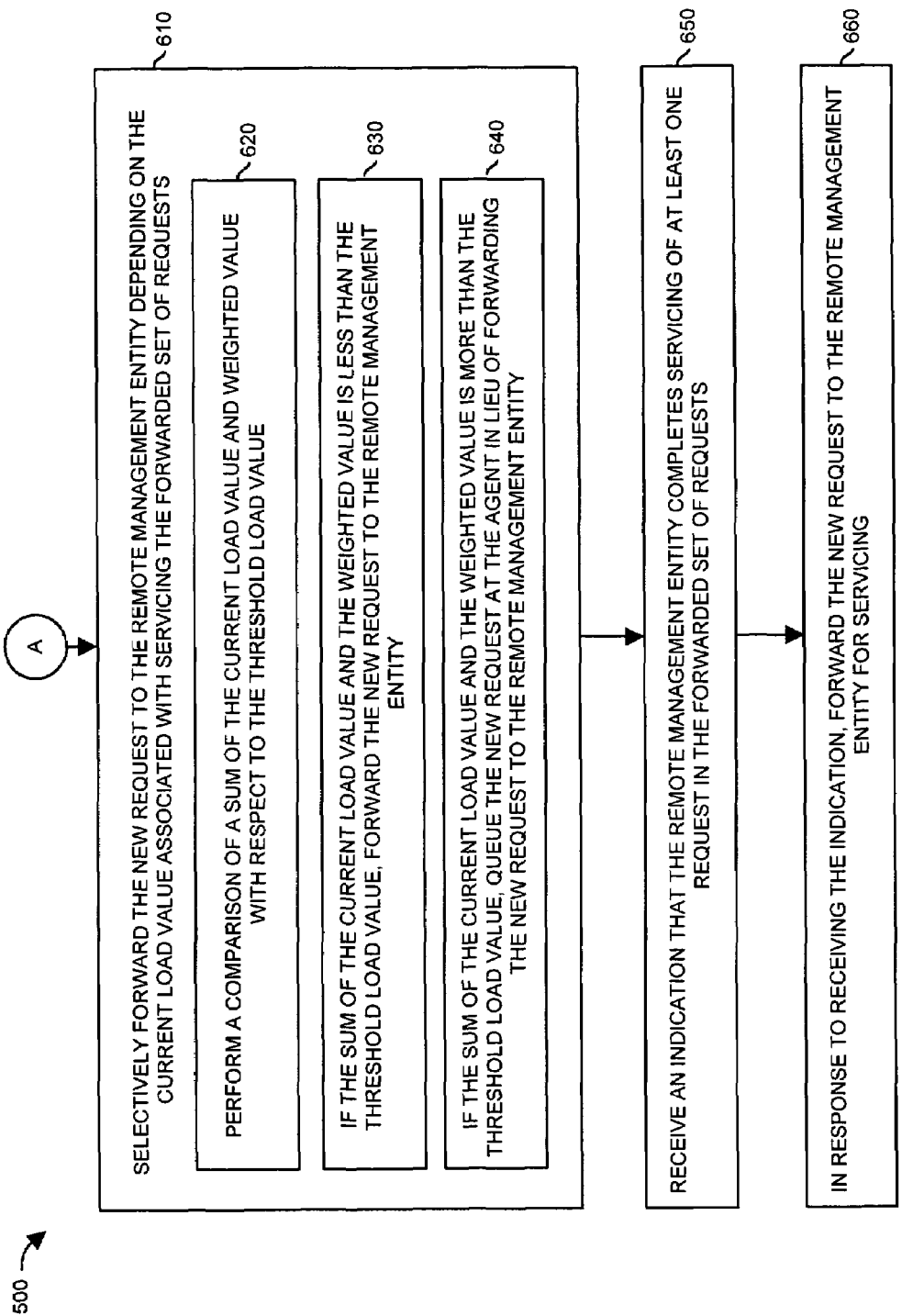

FIGS. 5 and 6 combine to form a flowchart 500 illustrating a technique of selectively forwarding requests from an agent 185-4 to a management entity 141-3 so that the management entity 141-3 is not inundated with too many requests at the same time.

In step 510, the agent 185-4 forward a set of requests (e.g., requests REQ1 through REQ5) to a remote management entity 141-3 for servicing by the remote management entity 141-3.

In step 520, the agent 185-4 calculates a current load value 235 corresponding to a relative burden placed on the remote management entity 141-3 to service the forwarded set of requests.

In sub-step 530 of step 520, the agent 185-4 determines a respective weight value for each corresponding request in the set of requests. Each respective weight value indicates a relative burden placed on the remote management entity 141-3 to service a corresponding request forwarded to the remote management entity 141-3.

In sub-step 540 in step 520, the agent 185-4 sums respective weight values associated with each request in the set of requests to produce the current load value 235. According to one configuration, a first weight value associated with a corresponding first request in the set of requests is different than a second weight value associated with a corresponding second request in the set of requests.

In step 550, the agent 185-4 identifies a threshold load value 225 corresponding to an ability of the remote management entity 141-3 to simultaneously handle multiple requests for information (or other types of commands) forwarded by the agent 185-4.

In step 560, while the remote management entity 141-3 services the set of requests, the agent 185-4 receives a new request to be forwarded from the agent 185 to the remote management entity 141-3.

In step 570, in response to receiving a new request, the agent 185-4 identifies a weighted value corresponding to an additional burden that would be placed on the remote management entity 141-3 if the new request were forwarded to the remote management entity 141-3 for servicing.

Continuing now to flowchart 500 in FIG. 6, in step 610, the agent 185-4 selectively forwards the new request to the remote management entity 141-3 depending on the current load value 235 associated with servicing the forwarded set of requests.

For example, in sub-step 620 in step 610, the agent 185-4 performs a comparison of a sum of the current load value 235 and weighted value with respect to the threshold load value 225.

In sub-step 630 in step 610, if the sum of the current load value and the weighted value is less than the threshold load value, the agent 185-4 forwards the new request to the remote management entity 141-3.

In sub-step 540 in step 520, if the sum of the current load value and the weighted value is more than the threshold load value, the agent 185-4 queues the new request at the agent 185-4 in lieu of forwarding the new request to the remote management entity 141-3.

In step 650, the agent 185-4 receives an indication that the remote management entity 141-3 completes servicing of at least one request in the forwarded set of requests.

In step 660, the agent 185-4, in response to receiving the indication, forwards the new request to the remote management entity 141-3 for servicing.

Figure 7:
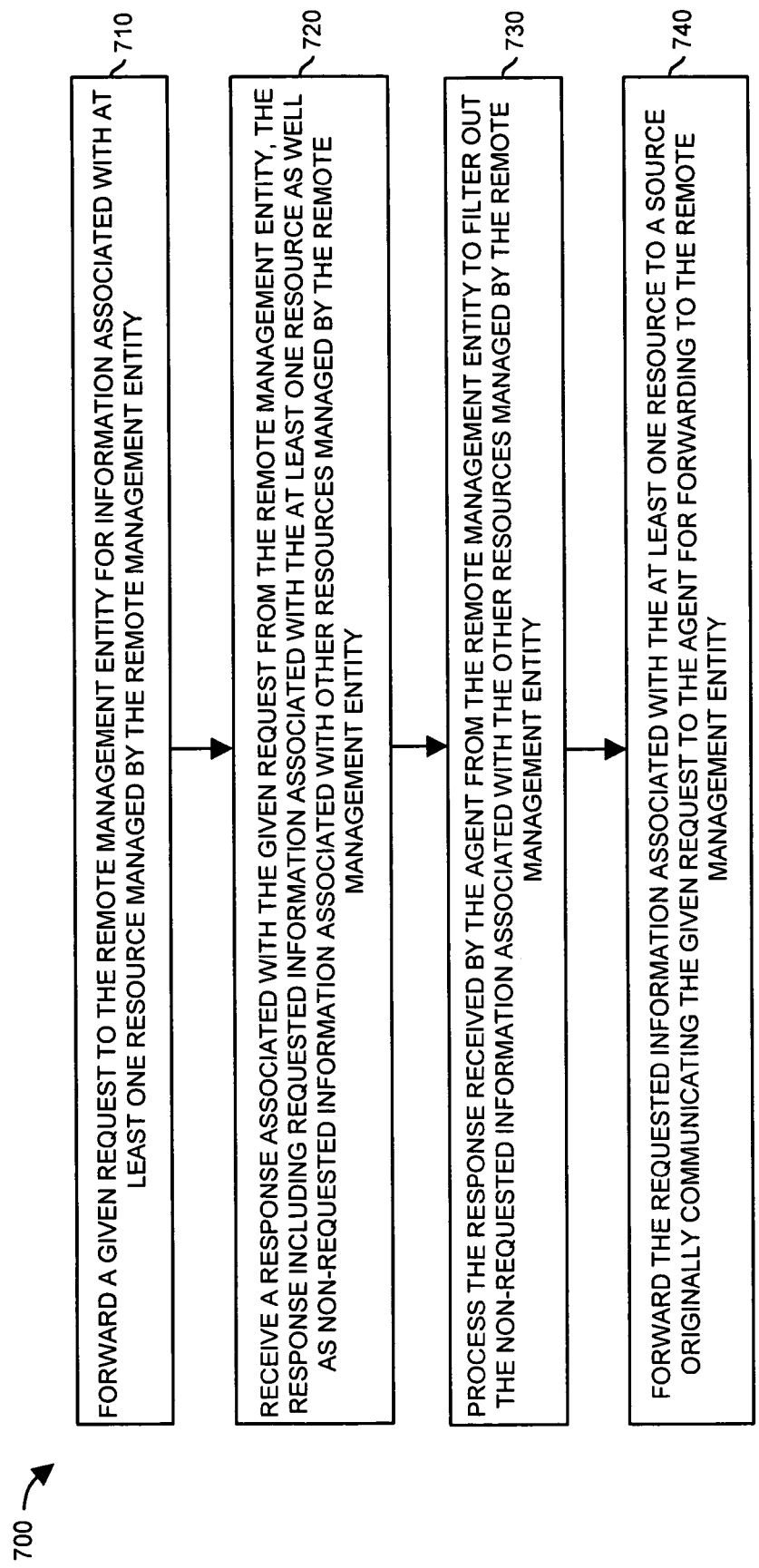
FIG. 7 is a flowchart illustrating a technique utilized by an agent to filter a response from a management entity according to an embodiment herein.

FIG. 7 is a flowchart 700 illustrating a technique of filtering data at the agent 185-4 so that computer system 110 does not needlessly receive non-requested information associated with a respective request.

In step 710, the agent 185-4 forwards a given request to the remote management entity 141-3 for information associated with one or more resources managed by the remote management entity 141-3.

In step 720, the agent 185-4 receives a response associated with the given request from the remote management entity 141-3. The response includes requested information associated with the one or more resources as well as non-requested information associated with other than the one or more resources managed by the remote management entity 141-3.

In step 730, the agent 185-4 processes the response received from the remote management entity 141-3 to filter out the non-requested information.

In step 740, the agent 185-4 forwards the requested information associated with the one or more resources to computer system 110 originally communicating the given request to the agent 185-4 for forwarding to the remote management entity 141-3.

Figure 8:
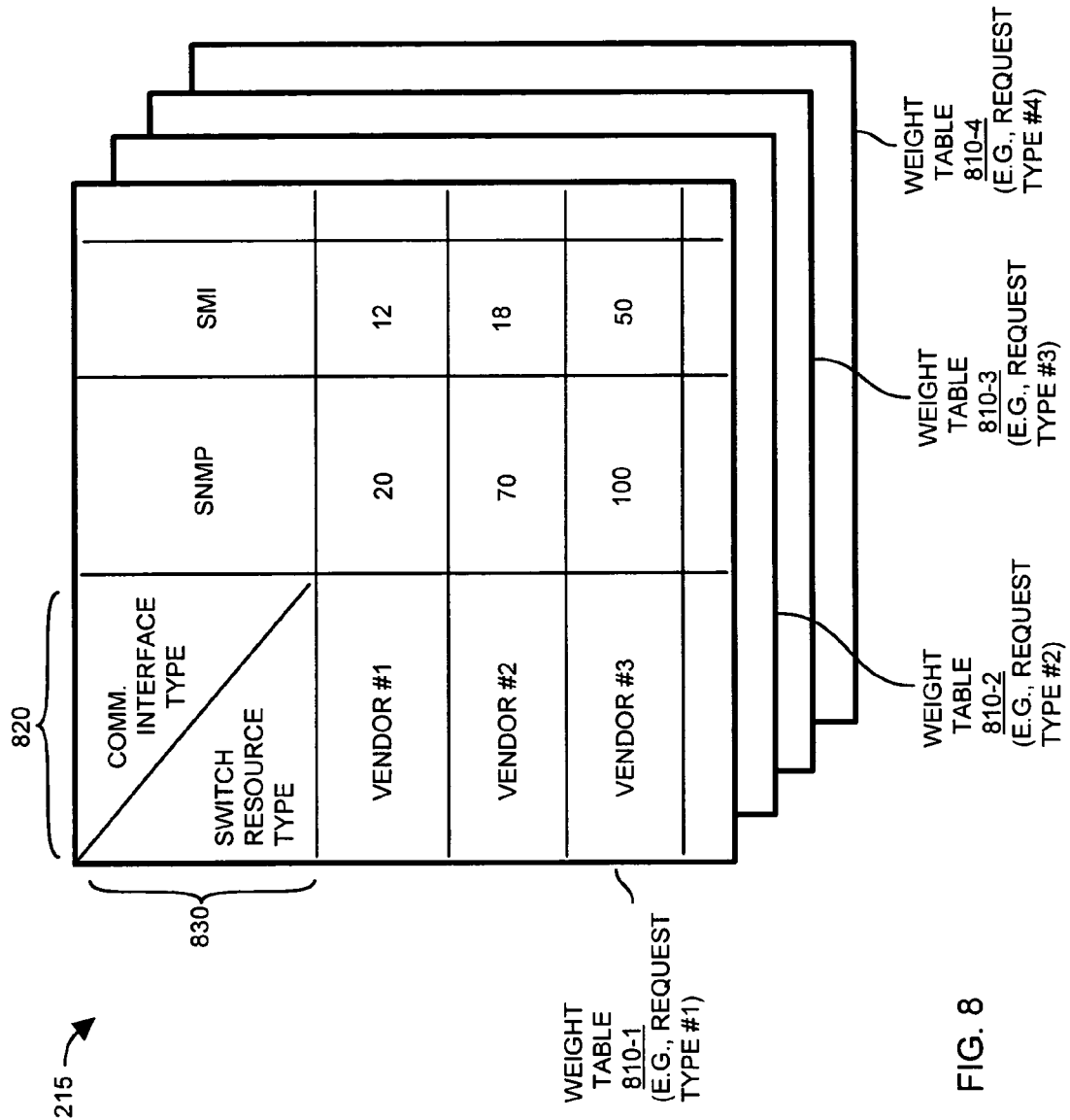
FIG. 8 is a diagram of a weight table for determining a weight value associated with requests to be forwarded to a management entity according to an embodiment herein.

FIG. 8 is a diagram of a sample weight table 215 according to an embodiment herein. As shown, weight table 810-1 can indicate respective weight values associated with requests of a first type. Weight table 810-2 indicates respective weight values associated with requests of a second type, and so on. In other words, agents 185 utilize one of weight tables 810 to identify a weight value associated with a request depending on a type of information requested. As mentioned, types of requests can include: requests for general switch resource information (typically requiring minimal process time to service), requests for port information associated with a switch resource managed by a respective management entity 141 (typically requiring a nominal amount of process time to service), requests for zone information associated with a particular switch resource (typically requiring a maximum amount of process time to service), etc.

Each weight table 810 includes a two-dimensional map to identify a weight value associated with a given request. For example, as illustrated in weight table 810-1, column 820 of weight table 810-1 identifies different switch resource types such as a vendors and/or models associated with a type of resource being queried. Row 830 of weight table 810-1 identifies different communication interface types (e.g., SNMP, SMI, FAL, etc.) associated with the given request, which is used to communicate with a respective management entity 141. Thus, for a given request of type #1, request processor in FIG. 2 identifies a respective weight value to assign to the given request based on a type of switch resource and communication interface associated with the given request.

As previously discussed, a weight value can identify a respective relative burden that would be placed on a management entity 141 if the given request were forwarded by the agent 185 to the management entity 141 for servicing. According to one configuration, the weight value identifies a number of processor cycles that would be required by the management entity 141 to service the given request. A metric associated with the weight value, however, may vary depending on the application.

FIG. 9 is a block diagram illustrating a sample storage area network environment 900 to utilize agents 185 according to an embodiment herein. As shown, storage area network 900 includes host entity 304-1, host entity 304-2, . . . (collectively, host entities 304), network 340 (e.g., a high speed fiber-based switch fabric), network 350 (e.g., LAN, WAN, Internet, intranet, fiber-based fabric, etc.), storage system resource 375-1, storage system resource 375-2, . . . (collectively, storage system resources 375), computer system 110, and repository 125 (e.g., database, storage, etc.).

Network 340 includes switch device 344-1, switch device 344-2 which themselves have corresponding switch ports 348 and 349. Network 340 also includes management entity 341-1, management entity 342-2, . . . (collectively, management entities 341) that control, manage, query resources in storage area network environment 900 and more specifically groups of resources in network 340. For example, management entity 341-1 can be configured to control groups of switches in switch device 344-1, management entity 341-2 can be configured to control groups of switches in switch device 344-2, etc.

Host entity 304-1 includes adapter 315-1 and corresponding port 320-1 and port 320-2 to communicate over network 340. Host entity 304-2 includes adapter 315-2 and corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2. Host entity 304-1 executes agent 185; host entity 304-2 executes agent 185-2; and host entity 304-N executes agent 185-3. Storage area network 900 can include any number of agents, each of which may operate on any computerized device in the storage area network environment 900. For example, agents can also potentially reside in respective devices in network 340, network 350, etc.

According to one configuration, computer system 110 (e.g., management control system) learns of groupings of resources in storage area network environment 900 and assigns a given agent in storage area network environment 900 duties of supporting exclusive sets of management functions associated with the group of resources. For example, the agents communicate with management entity 341 that, in turn, control groups of resources (e.g., switches 344) in network 340. Based on the assignments, agents 185 act on behalf of computer system 110 to control, manage or retrieve information associated with switch devices 344. For example, computer system 110 forwards requests to agents 185. The agents, as discussed above, selectively forward the requests to respective management entity 344 of storage area network environment 900. Proper configuration and control of switches 344 ensures that host entities 304 may efficiently access data from storage system resources 375 on behalf of clients.

Agents can be distributed throughout storage area network environment 900 as shown. In one application, agents 185 run on respective host entities 304 that are not dedicated to serving data from storage area network environment 900 to corresponding clients. In other words, agents optionally run on host resources (e.g., host entities 304) that are at least partially dedicated to executing agents, but not serving clients. Agents may also run on host entities that do serve data retrieved from storage system resources 375 to respective clients.

For illustrative purposes, computer system 110 (e.g., a management control center) is configured, in this example, as a storage area network management station operated by a user 108 such as a network manager responsible for managing resources in the storage area network 900. For example, computer system 110 executes a resource manager application 120 (e.g., a software graphical user interface application) that generates and displays information in accordance with embodiments of the present application as will be explained herein. The resource manager 120 may be any type of network management software application that executes, performs, or otherwise operates within computer system 110 such as a computerized management station.

The management station computer system 110 (e.g., a computer device) includes a corresponding display 130 (e.g., a monitor or other visual display device) that resource manager 120 controls to display a graphical user interface 150. In general, graphical user interface 150 presented by a software application (e.g., resource manager 120) running on computer 110 enables user 108 to initiate execution of commands to associated devices such as switches 344 in storage area network environment 100. For example, a user 108 may provide input commands (e.g., selections by clicking on a mouse) to i) control information (e.g., tables, pop-up screens, etc.) displayed on display 130 and ii) request an agent 185 (or other agents as is generally the case throughout this document) to perform a management function (e.g., configuration of switches 344) such as request information from a specific management entity 344 in storage area network environment 900.

Computer system 110 and, more particularly, resource manager 120 stores learned attributes associated with storage area network environment 900 in repository 125. Based on management capabilities reported by agents 185 to computer system 110, resource manager 120 notifies (e.g., via a display screen 130 of selectable options in graphical user interface 150) user 108 of management functions that can be performed on resources (e.g., switch devices) in the storage area network environment 100.

Note again that storage area network environment 900 enables host entities 304 (e.g., servers, etc.) to access data in storage system resources 375 on behalf of clients coupled to or through the host entities 304. However, as discussed, certain host entities 304 are optionally dedicated to running agent applications 140 rather than server applications for serving data to clients.

The following discussion illustrates how certain host entities 304 in storage area network environment 900 serve data to clients. For example, host entity 304-1 couples to network 340 via adapter 315-1 and corresponding ports 320. Ports 320 couple to respective ports 348 and 349 on switch devices 344. In turn, ports 348 and 349 of switch devices 344 couple to ports 354 and 355 of corresponding storage system resources 375. Thus, switch devices 344 and corresponding ports 348 and 349 form at least part of a data path (e.g., a zone) between host entities 304 and corresponding storage system resources 375.

Storage system resource 375-1 includes access controllers 362 to facilitate access to corresponding storage devices 365 (e.g., logical storage space). Storage devices 365 are configured as logical portions of one or more physical storage devices 380 (e.g., arrays of storage disks). Maps 370 provide a mapping of storage devices 365 (e.g., logical volumes) to corresponding physical storage devices 380 (e.g., storage disks).

Typically, selected host entities 304 are limited to accessing certain storage devices 365 in storage system resource 375-1 based at least in part on configuration settings of switch devices 344 of network 340. For example, in one embodiment, switch ports 348 and 349 of switches 344 are assigned to create a particular zone in network 300. In general, a zone defines a group of resources in the network providing a logical path i) through a switch resource 302 and ii) between a host resource 301 and a storage array resource 303. Thus, in some respects, a zone defines a logical data flow path in the storage area network environment 100.

As discussed, computer system 110 assigns agents 185 to manage different groupings of resources to more effectively support configuration of and communication within storage area network environment 900. Based on the assignments, agents 185 in storage area network environment 900 enable user 108 to configure the storage area network environment 900 so that host entities can more efficiently access data on behalf of corresponding clients. That is, assigning agents to manage groups of resources controlled by management entities 341 enable the computer system 110 and corresponding user 108 to more efficiently manage resources (e.g., groups of resources) in storage area network environment 900.

As discussed above, techniques herein are well suited for use in systems in which a management control center communicates with agents that, in turn, selectively forward requests to management entities of a storage area network. However, it should be noted that embodiments of the present application are not limited to such use.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

What is claimed is:

1. A method to manage forwarding of requests for information from an agent to a remote management entity, the method comprising:
   forwarding a set of requests from the agent to the remote management entity for servicing by the remote management entity;
   calculating a current load value corresponding to a relative burden placed on the remote management entity to service the forwarded set of requests;
   while the remote management entity services the set of requests, receiving a new request to be forwarded from the agent to the remote management entity;
   selectively forwarding the new request to the remote management entity depending on the current load value associated with servicing the forwarded set of requests;
   in response to detecting that forwarding the new request to the remote management entity would overburden the remote management entity, queuing the new request at the agent for forwarding the new request to the remote management entity at a later time;
   receiving an indication based on a message received from the remote management entity that the remote management entity completed servicing of at least one request in the forwarded set of requests; and
   in response to receiving the indication, forwarding the new request to the remote management entity for servicing,
   wherein calculating the current load value includes:
      determining a respective weight value for each corresponding request in the set of requests, each respective weight value indicating a relative burden placed on the remote management entity to service a corresponding request forwarded to the remote management entity; and
      summing respective weight values associated with each request in the set of requests to produce the current load value, the current load value being a numerical value whose magnitude indicates the relative burden on the remote management entity to service previously forwarded requests, a first weight value associated with a corresponding first request in the set of requests being different than a second weight value associated with a corresponding second request in the set of requests.

2. A method as in claim 1 further comprising:
   identifying a threshold load value corresponding to an ability of the remote management entity to simultaneously handle multiple requests for information forwarded by the agent; and
   in response to receiving the new request, identifying a weight value corresponding to an additional burden that would be placed on the remote management entity if the new request were forwarded to the remote management entity for servicing.

3. A method as in claim 2 further comprising:
   performing a comparison of a sum of the current load value and the weight value with respect to the threshold load value; and
   wherein selectively forwarding the new request to the remote management entity includes:
      if the sum of the current load value and the weight value is less than the threshold load value, forwarding the new request to the remote management entity; and
      if the sum of the current load value and the weight value is more than the threshold load value, queuing the new request at the agent in lieu of forwarding the new request to the remote management entity.

4. A method as in claim 3, wherein identifying the additional burden associated with the new request includes generating the weight value associated with the new request based on at least two of: i) a type of switch resource managed by the remote management entity, ii) an interface type associated with a respective interface of the remote management entity used to communicate with the agent, and iii) a type of information being requested from the remote management entity by the new request.

5. A method as in claim 1, wherein selectively forwarding the new request to the remote management entity includes detecting, based on the magnitude of the current load value, whether forwarding the new request to the remote management entity, if forwarded and processed along with the set of requests, would overburden the remote management entity with a task of servicing requests forwarded from the agent.

6. A method as in claim 1 further comprising:
receiving attributes associated with resources of the remote management entity employed to facilitate servicing of requests for information;
based on the attributes associated with the resources of the remote management entity, identifying a threshold load value corresponding to an ability of the remote management entity to simultaneously handle multiple pending requests forwarded by the agent for retrieval of information from the remote management entity; and
utilizing the threshold load value as a gauge to selectively forward the new request to the remote management entity.

7. A method as in claim 1, wherein forwarding the set of requests from the agent to the remote management entity includes forwarding a given request to the remote management entity for retrieval of information associated with at least one resource managed by the remote management entity, the method further comprising:
receiving a response associated with the given request from the remote management entity, the response including requested information associated with the at least one resource as well as non-requested information associated with other resources managed by the remote management entity.

8. A method as in claim 7 further comprising:
processing the response received by the agent from the remote management entity to filter out the non-requested information associated with the other resources managed by the remote management entity; and
forwarding the requested information associated with the at least one resource to a source originally communicating the given request to the agent for forwarding to the remote management entity.

9. A computer system that manages forwarding of requests for information to a remote management entity, the computer system comprising:
a processor;
a memory unit that stores instructions associated with an application executed by the processor; and
an interconnect coupling the processor and the memory unit, enabling the computer system to execute the application and perform operations of:
forwarding a set of requests to the remote management entity for servicing by the remote management entity;
calculating a current load value corresponding to a relative burden placed on the remote management entity to service the forwarded set of requests;
while the remote management entity services the set of requests, receiving a new request to be forwarded to the remote management entity;
selectively forwarding the new request to the remote management entity depending on the current load value associated with servicing the forwarded set of requests;
in response to detecting that forwarding the new request to the remote management entity would overburden the remote management entity, queuing the new request at the computer system for forwarding the new request to the remote management entity at a later time;
receiving an indication that the remote management entity completes servicing of at least one request in the forwarded set of requests; and
in response to receiving the indication, forwarding the new request to the remote management entity for servicing:
wherein calculating the current load value includes:
determining a respective weight value for each corresponding request in the set of requests, each respective weight value indicating a relative burden placed on the remote management entity to service a corresponding request forwarded to the remote management entity; and
summing respective weight values associated with each request in the set of requests to produce the current load value, the current load value being a numerical value whose magnitude indicates the relative burden on the remote management entity to service previously forwarded requests, a first weight value associated with a corresponding first request in the set of requests being different than a second weight value associated with a corresponding second request in the set of requests.

10. A computer program product including a computer-readable storage medium having instructions stored thereon for processing data information, such that the instructions, when carried out by a processing device, enable the processing device to perform the steps of:
forwarding a set of requests to a remote management entity for servicing by the remote management entity;
calculating a current load value corresponding to a relative burden placed on the remote management entity to service the forwarded set of requests;
while the remote management entity services the set of requests, receiving a new request to be forwarded to the remote management entity; and
selectively forwarding the new request to the remote management entity depending on the current load value associated with servicing the forwarded set of requests;
in response to detecting that forwarding the new request to the remote management entity would overburden the remote management entity, queuing the new request at the computer system for forwarding the new request to the remote management entity at a later time;
receiving an indication that the remote management entity completes servicing of at least one request in the forwarded set of requests; and
in response to receiving the indication, forwarding the new request to the remote management entity for servicing:
wherein calculating the current load value includes:
determining a respective weight value for each corresponding request in the set of requests, each respective weight value indicating a relative burden placed on the remote management entity to service a corresponding request forwarded tot he remote management entity; and
summing respective weight values associated with each request in the set of requests to produce the current load value, the current load value being a numerical value whose magnitude indicates the relative burden on the remote management entity to service previously forwarded requests, a first weight value associated with a corresponding first request in the set of requests being different than a second weight value associated with a corresponding second request in the set of requests.

11. The method as in claim 1, wherein each request in the set of requests and the new request is a request for retrieval of storage area network configuration data from the remote management entity.

12. The method as in claim 11, wherein receiving the indication from the remote management entity includes:

receiving a response from the remote management entity that the at least one request in the set of requests has been serviced, the response including data about a storage area network resource as specified by the at least one request, the method further comprising:

identifying a weighted value associated with the at least one request that has been serviced by the remote management entity, the weighted value representing a relative burden placed on the remote management entity to service the at least one request; and based on receipt of the response, updating the current load value by the weighted value associated with the at least one request to reflect that the at least one request has been serviced by the remote management entity.

13. A method as in claim 12, wherein receiving the response includes receiving requested information associated with the at least one resource as well as non-requested information associated with resources other than the at least one resource managed by the remote management entity, the method further comprising:

processing the response received from the remote management entity to filter out the non-requested information; and forwarding the requested information to a source from which the at least one request was received.

14. The method as in claim 11 further comprising:

queuing the new request and a corresponding weight value associated with the new request, the corresponding weight value associated with the new request indicating a relative burden associated with processing the new request at the remote management entity; and in response to receiving the indication, adjusting the current load value by an amount as specified by a weight value associated with the at least one request serviced by the remote management entity, the corresponding weight value associated with the at least one request indicating a relative burden associated with processing the at least one request at the remote management entity.

15. The method as in claim 14 further comprising:

summing the adjusted current load value and the corresponding weight value associated with the new request;

initiating comparison of the summation of the adjusted current load value and the corresponding weight value of the new request with respect to a threshold value, the comparison indicating that the remote management entity is able to service the new request;

based on the comparison, forwarding the new request to the remote management entity for servicing; and adjusting the current load value by the corresponding weight value of the new request.

16. The method as in claim 15 further comprising:

maintaining a queue to store the set of requests as well as other requests;

in response to detecting that the queue becomes overloaded with requests, providing notification to a source from which the requests are received to prevent a timeout from occurring.

17. The method as in claim 1, wherein the agent calculates the numerical value to keep track of whether the remote management entity is able to receive additional requests from the agent for servicing, the method further comprising:

detecting, based on the magnitude of the numerical value, that forwarding the new request to the remote management entity would overburden the remote management entity.

18. The method as in claim 17 further comprising:

in response to receiving the indication, modifying the magnitude of the numerical value to account for completed servicing of the at least one request by the remote management entity; and wherein forwarding the new request to the remote management entity occurs in response to detecting that a magnitude of the modified numerical value indicates that the remote management entity can service the new request.

* * * * *